3,304,303
PYRAZOLE-CARBOXYLIC ACID-HYDRAZIDES

Paul Schmidt, Therwil, and Kurt Eichenberger and Max Wilhelm, Basel, Switzerland, assignors to Ciba Corporation, New York, N.Y., a corporation of Delaware
No Drawing. Filed July 12, 1965, Ser. No. 471,418
Claims priority, application Switzerland, Dec. 24, 1959, 82,329/59; Apr. 5, 1960, 3,803/60
8 Claims. (Cl. 260—247.1)

This is a continuation-in-part of our application Serial No. 77,286 filed December 21, 1960, now U.S. Patent No. 3,234,217, issued February 8, 1966.

The present invention provides pyrazole-carboxylic acid-N'-[5-nitrofuryl-(2)-methylidene]-hydrazides, if desired their quaternary ammonium derivatives and salts thereof.

In the new compounds the carboxylic acid hydrazide group is preferably in one of the positions 3, 4 or 5 of the pyrazole nucleus, above all in position 4. The new compounds can be substituted in any desired manner. More especially, the pyrazole nucleus may contain further substituents; above all it may be N-substituted, for example by unsubstituted or substituted hydrocarbon radicals, saturated or unsaturated heterocyclic or heterocyclic-aliphatic radicals.

Hydrocarbon radicals are, for example, saturated or unsaturated aliphatic, alicyclic, alicyclic-aliphatic, araliphatic or aromatic hydrocarbon radicals, such as lower straight or branched alkyl or alkenyl radicals, for example, methyl, ethyl, propyl, isopropyl, straight or branched radicals linked in any desired position, being butyl, pentyl, hexyl or heptyl, allyl or methallyl radicals, cycloalkyl or cycloalkenyl radicals such as cyclopentyl, cyclohexyl, cycloheptyl, cyclopentenyl, cyclohexenyl radicals, cycloalkyl- or alkenyl-alkyl radicals, such as cyclopentyl- or cyclohexenyl-methyl, -ethyl or -propyl radicals, aralkyl- or aralkenyl- such as phenylmethyl, -ethyl, -vinyl or -propyl radicals or aryl radicals, more especially phenyl radicals. Suitable heterocyclic or heterocyclic-aliphatic radicals are above all mono-nuclear ones, such as pyridyl radicals.

As substituents of the aforementioned aliphatic radicals there may be mentioned more especially free or substiutted hydroxyl, mercapto or amino groups in which the substituents are preferably of aliphatic nature, for example lower alkoxy, alkylmercapto or mono- or di-alkyl- or -cyclo-alkyl-amino groups, alkylene-amino, oxaalkyleneamino, aza-alkyleneamino or thiaalkylene-amino groups, such as methyl-, ethyl-, propyl-, butyl-, pentyl- or hexyl-oxy or -mercapto groups, methyl-, dimethyl-, ethyl-, diethyl-, propyl-, dipropyl-, N-methyl-N-propyl-, N-methyl-N-cyclopropyl-, butyl-, dibutyl-amino groups, pyrrolidino, piperidino, morpholino or piperazine groups, for example the piperazino, N-methylpiperazino or N-hydroxyethyl-piperazino groups.

The aliphatic radicals may also be substituted by halogen atoms such as chlorine, bromine or iodine.

The alicyclic radicals may contain above all lower alkyl radicals.

Aromatic or heterocyclic radicals may contain above all halogen atoms or the abovementioned free or substituted hydroxyl, mercapto r amino groups, alkyldioxy, alkylenedioxy, nitro groups or free or converted carboxyl groups. In the alicyclic-aliphatic, araliphatic and heterocyclicaliphatic radicals both components may be substituted as described above.

Substituents at the ring C atoms of the pyrazole ring are more especially amino groups, such as the amino group or an acylamino group, e.g. a lower alkanoyl, benzoyl or phenylalkanoyl group or a lower alkyl or phenyl radical, such as methyl, ethyl, propyl or phenyl; the phenyl radicals may be substituted as indicated above.

Furthermore, the new compounds may also be substituted for example at the hydrazide nitrogen, above all by one of the aforementioned substituted or unsubstituted hydrocarbon or heterocyclic groups, more especially by alkyl.

Quaternary ammonium derivatives are above all the alkyl or benzyl ammonium compounds of tertiary bases.

From among pyrazole-carboxylic acids from which the new compounds may be derived there may be mentioned especially: Pyrazole-carboxylic acids of the formula

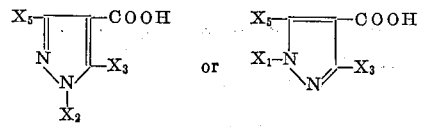

in which $X_1$ and $X_2$ each represent hydrogen, alkyl, oxyalkyl, halogenalkyl, tertiary aminoalkyl or phenyl radicals, and $X_3$ and $X_5$ each represent a hydrogen atom or an amino, alkyl or phenyl group.

The new compounds develop a valuable antibacterial action, above all on cocci. They further act against protozoae, such, for example as trypanosomes, trichomonades or amoebae. They can therefore be used as chemotherapeuticals, for example in treating streptococcal, staphylococcal or protozoan infections in animals or humans. They are also active against colibacteria and can be used as urine-disinfectants. They can also be used as intermediates for the manufacture of medicaments.

Especially valuable are those pyrazole compounds of the kind defined above in which the pyrazole nucleus is N-unsubstituted or N-substituted by one of the specified radicals and contains in addition to the carboxylic acid hydrazide group, a free or substituted amino group attached to a carbon atom; of special value are the compounds of the formula

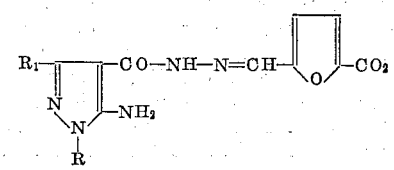

and

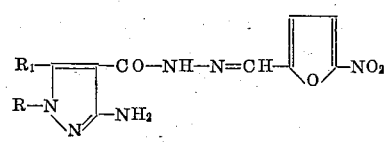

their N-acyl derivatives and salts thereof. In these formulae R represents an alkyl, cycloalkyl, hydroxyalkyl, alkoxyalkyl, halogenoalkyl or tertiary aminoalkyl group in which the alkylene chains contain 2 to 4 carbon atoms, or it may represent a phenyl, benzyl or pyridyl radical, and $R_1$ represents a hydrogen atom or a lower alkyl radical. The tertiary amino group is above all a di-lower alkylamino, alkyleneamino oxaalkyleneamino or azaalkyleneamino group, more especially a dimethylamino, diethylamino, pyrrolidino, piperidino, morpholino, piperazino or N-alkyl-piperazino group. The phenyl or benzyl radicals may contain lower alkoxy, alkyl-mercapto, alkyl-, alkylenedioxy groups and/or halogen atoms.

The acyl radicals are more especially those of lower fatty acids or benzoic acids.

The invention provides above all the compounds of the formula

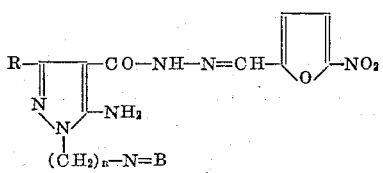

and their salts, in which N=B represents a lower dialkylamino, morpholino, piperazino, pyrrolidino or piperidino group; n=2 or 3; and R represents hydrogen or methyl—above all the 2-(β-diethylaminoethyl)-3-amino-4-carboxylic acid-N'-(5-nitro-2-furfurylidene)-hydrazide of the formula

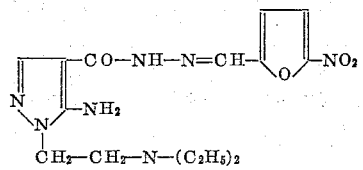

and salts thereof, and 2-(β-dimethylamino-ethyl)-3-aminopyrazole - 4-carboxylic acid-N'-(5-nitro-2-furfurylidene)-hydrazide and its salts.

The new compounds are prepared by methods known per se. Advantageously, a pyrazole-carboxylic acid hydrazide is condensed with a 5-nitrofuran-(2)-carbonyl compound, more especially with 5-nitrofuran-2-aldehyde, to form the hydrazone. This condensation is carried out in the usual manner, and the carbonyl group may also be in a reactively converted form. Thus it is possible to use, for example, acetals, thioacetals, oximes, bisulfite compounds or acylates of the carbonyl compounds.

The aforementioned reactions are carried out in the usual manner, preferably in the presence of diluents, condensing agents or catalysts, at room temperature or below or above it, if desired, under superatmospheric pressure.

The starting materials are known or can be made by methods known per se. If desired, they may be used in the forms of their salts or quaternary compounds.

The starting materials used, namely the 3-hydroxy- or 3-aminopyrazole-4-carboxylic acid hydrazides which are substituted in position 1 or 2 by alkyl, hydroxyalkyl, aminoalkyl preferably secondary or tertiary aminoalkyl or a chlorophenyl radical, as well as their salts, are new and form another object of the present invention. They are obtained in the usual manner, for example by reacting a suitable carboxylic acid or a reactive derivative thereof with hydrazine.

Depending on the reaction conditions and starting materials used the new compounds are obtained in the free form or in the form of salts thereof. The salts of the new compounds can be converted in the known manner into the free compounds, acid addition salts, for example by reaction with a basic agent, or a metal salt if desired by reaction with an acid. On the other hand, a resulting acid compound can be converted into a salt by treatment with a basic agent, for example with a hydroxide or carbonate of an alkali metal such as sodium hydroxide or potassium carbonate; or a resulting free base on the other hand can be made into a salt with an inorganic or organic acid. Acid addition salts are advantageously prepared with therapeutically useful acids, for example hydrohalic acids, for example hydrochloric or hydrobromic acid, perchloric acid, nitric or thiocyanic acid, sulfuric or phosphoric acids, or organic acids, such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methanesulfonic, ethanesulfonic, hydroxyethanesulfonic, benzenesulfonic, paratoluenesulfonic, naphthalenesulfonic or sulfanilic acid, or methionine, tryptophan, lysine or arginine. The salts may be mono-salts or poly-salts.

When a resulting compound contains a tertiary amino group it can be converted by a known method into a quaternary ammonium compound, more especially by reaction with an alkyl- or benzyl-halide, -sulfate or -sulfonate such, for example, as methyl-, ethyl-, or propylchloride, -bromide or -iodide, or with a dialkyl sulfate, for example dimethyl sulfate or diethyl sulfate. Quaternary ammonium salts can also be converted into ammonium hydroxides, for example by the action of freshly precipitated silver oxide on an ammonium halide, or by the action of barium hydroxide solution on an ammonium sulfate; from these ammonium salts other ammonium salts can be prepared by reaction with acids, for example with those mentioned above.

The new compounds are intended to be used as medicaments in the form of pharmaceutical preparations containing them in admixture with an organic or inorganic solid or liquid pharmaceutical vehicle suitable for local, enteral (for example oral) or parenteral administration. Suitable vehicles are substances that do not react with the new compounds, such for example as water, gelatine, lactose, starches, magnesium stearate, talc, vegetable oils, benzyl alcohols, gums, polyalkylene glycols, white petroleum jelly, cholesterol or other known medicinal vehicles. The pharmaceutical preparations may be, for example, tablets, dragees, capsules, or in liquid form, solutions, suspensions or emulsions. They may be sterilized and/or may contain assistants such as preservatives, stabilizers, wetting agents or emulsifiers, salts for regulating the osmotic pressure or buffers. They may also contain other thereapeutically valuable substances. The new compounds can also be used as additives to animal feed or in the form of veterinary preparations.

The following examples illustrate the invention:

*Example 1*

A mixture of 15.5 grams of 3-amino-4-carbethoxypyrazole and 20 grams ow hydrazine hydrate is heated for 5 hours on a bath at 120° C., then allowed to cool and the residue is crystallized from much boiling ethanol, to yield 3-aminopyrazole-4-carboxylic acid hydrazide of the formula

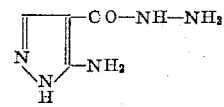

in colorless crystals melting at 221–222° C.

*Example 2*

A mixture of 25.4 grams of 2-(β-diethylaminoethyl)-3-amino-4-carbethoxypyrazole and 75 cc. of hydrazine hydrate is heated for 6 hours at 130° C., then cooled, and the crystals are suctioned off and recrystallized from ethanol, to yield 2-(β-diethylaminoethyl)-3-aminopyrazole-4-carboxylic acid hydrazide of the formula

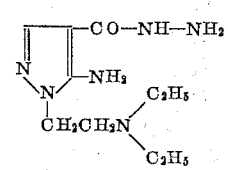

melting at 143–145° C.

A solution of 11.7 grams of this base in 50 cc. of absolute ethanol is treated with 34.4 cc. of 1.42 N-ethanolic hydrochloric acid, whereupon the hydrochloride of 2-(β-diethylaminoethyl)-3-aminopyrazole-4-carboxylic acid hydrazide melting at 189–191° C. separates out.

Example 3

A mixture of 53.2 grams of 2-(β-piperidinoethyl)-3-amino-4-carbethoxypyrazole and 150 grams of hydrazine hydrate is heated for 6 hours on a bath of 130° C., allowed to cool, and the crystals are suctioned off and recrystallized from ethanol, to yield 2-(β-piperidinoethyl) - 3 - amino - 4 - carboxylic acid hydrazide of the formula

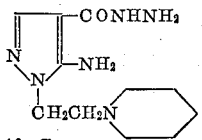

melting at 183–184° C.

A solution of 16 grams of the above base in 150 cc. of warm ethanol is treated with 44.8 cc. of 1.42 N-ethanolic hydrochloric acid. The separating crystals are suctioned off, to yield the hydrochloride of 2-(β-piperidinoethyl)-3-aminopyrazole-4-carboxylic acid hydrazide melting at 237–239° C.

Example 4

(a) A solution of 15.2 grams of 2-(β-hydroxyethyl)-3-amino-4-cyanopyrazole in 150 cc. of thionyl chloride is heated for 2 hours at 50–60° C. The thionyl chloride is then evaporated in vacuo and the residue is treated with ice water and adjusted with N-sodium hydroxide solution to pH 8. The precipitate is then suctioned off and recrystallized from ethanol, to yield 2-(β-chloroethyl)-3-amino-4-cyanopyrazole in yellow crystals melting at 154–155° C. 170 grams of the latter compound are heated with 515 cc. of diethylamine for 1½ hours at 100° C. in a closed vessel, evaporated in vacuo, and the residue is triturated with water. The resulting insoluble constituent is the 2-(β-diethylaminoethyl)-3-amino-4-cyanopyrazole of the formula

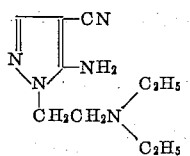

melting at 108–109° C.

A mixture of 103 grams of 2-(β-diethylaminoethyl)-3-amino-4-cyanopyrazole and 80 cc. of concentrated sulfuric acid in 1.6 liters of absolute ethanol is heated in an autoclave for 3 hours at 140° C., allowed to cool, evaporated in vacuo, and the residue is poured into a cooled sodium bicarbonate solution and repeatedly extracted with ether. The ethereal solution is dried and evaporated. Fractional distillation of the residue yields 2-(β-diethylaminoethyl)-3-amino-4-carbethoxypyrazole of the formula

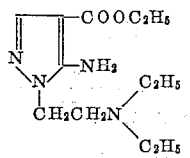

which boils at 139–141° C. under a pressure of 0.05 mm. Hg.

(b) A mixture of 170 grams of 2-(β-chloroethyl)-3-amino-4-cyanopyrazole and 800 cc. of piperdine is heated for 1½ hours on a water bath, evaporated in vacuo, and the residue is triturated with water. The insoluble constituent so obtained is 2-(β-piperidinoethyl)-3-amino-4-cyanopyrazole of the formula

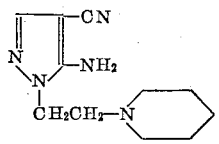

which melts at 137.5–138.5° C. after having been recrystallized from alcohol.

A mixture of 65.7 grams of 2-(β-piperidinoethyl)-3-amino-4-cyanopyrazole and 81 grams of concentrated sulfuric acid in 1.2 liters of absolute alcohol is heated in an autoclave for 3 hours at 140° C., allowed to cool and evaporated in vacuo. The residue is poured into a cooled sodium bicarbonate solution and repeatedly extracted with ether. The ethereal solution is dried and evaporated, to yield 2-(β-piperidinoethyl)-3-amino-4-carbethoxypyrazole of the formula

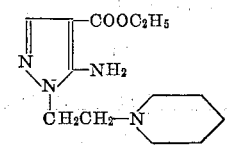

which melts at 86–87° C. after recrystallization from petroleum ether.

(c) A mixture of 136 grams of 2-(β-chloroethyl)-3-amino-4-cyanopyrazole and 480 cc. of morpholino is heated for 1½ hours on a boiling water bath, evaporated in vacuo and the residue is triturated with water. The insoluble constituent is recrystallized from methanol, to yield 2-(β-morpholinoethyl)-3-amino-4-cyanopyrazole of the formula

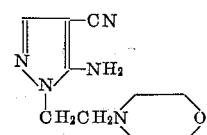

melting at 123–124° C.

98 grams of 2-(β-morpholinoethyl)-3-amino-4-cyanopyrazole and 71 cc. of concentrated sulfuric acid in 1.55 liters of absolute ethanol are heated in an autoclave for 3 hours at 140° C., allowed to cool, evaporated in vacuum and the residue is poured into a cooled sodium bicarbonate solution and repeatedly extracted with ether. The ethereal solution is evaporated and the residue recrystallized from ether-petroleum ether, to yield 2-(β-morpholinoethyl)-3-amino-4-carbethoxypyrazole of the formula

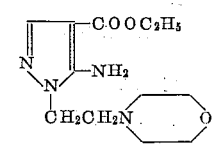

melting at 60–63° C.

The hydrochloride of this compound, melting at 232–234° C., is obtained by dissolving it in ethanol and treating the solution with ethanolic hydrochloric acid.

A mixture of 53.6 grams of 2-(β-morpholinoethyl)-3-amino-4-carbethoxypyrazole and 150 grams of hydrazine hydrate is heated for 6 hours on a boiling water bath, allowed to cool and the precipitated crystals are suctioned off and recrystallized from ethanol, to yield 2-(β-morpholinoethyl)-3-aminopyrazole-4-carboxylic acid hydrazide of the formula

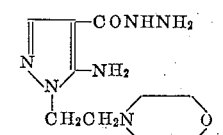

melting at 193–194° C.

A solution of 10.16 grams of this base in 220 cc. of ethanol is treated with 28.2 cc. of 1.42 N-ethanolic hydrochloric acid, whereupon the hydrochoride of 2-(β-morpholinoethyl)-3-aminopyrazole-4-carboxylic acid hydrazide, melting at 228–230° C., precipitates.

Example 5

A mixture of 39.4 grams of 2-isopropyl-3-amino-4-carbethoxypyrazole and 40 cc. of hydrazine hydrate is heated for 5 hours on a bath at 120° C., then evaporated in vacuo to dryness and the residue is crystallized from ethyl acetate, to yield 2-isopropyl-3-aminopyrazole-4-carboxylic acid hydrazide of the formula

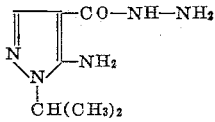

in colorless crystals melting at 152–153° C.

Example 6

A mixture of 39.4 grams of 2-isopropyl-5-amino-4-carbethoxypyrazole and 40 cc. of hydrazine hydrate is heated for 6 hours on a bath at 120° C., then allowed to cool and the residue is crystallized from much boiling ethanol, to yield 2-isopropyl-5-aminopyrazole-4-carboxylic acid hydrazide of the formula

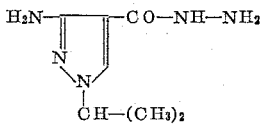

in colorless crystals melting at 146–148° C.

Example 7

50 grams of ethoxymethylene ethyl malonate and 40 grams of β-diethylaminoethylhydrazine in 75 cc. of ethanol are heated for 5 hours at the boil. The reaction product is evaporated in vacuo and the residue is recrystallized from methylene chloride+diethyl ether, to yield 2-(β-diethylaminoethyl)-3-hydroxy-4-carbethoxypyrazole of the formula

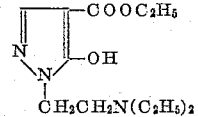

in crystals melting at 155° C.

Example 8

A mixture of 30 grams of 2-(para-chlorophenyl)-3-amino-4-carbethoxypyrazole and 150 cc. of hydrazine hydrate is heated for 7 hours at 120° C., then cooled and the precipitate formed is recrystallized from dimethyl formamide+ethanol, to yield 2-(para-chlorophenyl)-3-aminopyrazole-4-carboxylic acid hydrazide of the formula

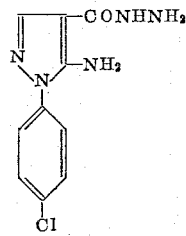

in white crystals melting at 236° C.

Example 9

A mixture of 170 grams of 2-(β-chloroethyl)-3-amino-4-cyanopyrazole and 690 cc. of hexamethyleneimine is heated for 1½ hours at 100° C., then evaporated to dryness in vacuo and the residue is triturated with water and the crystals are suctioned off and recrystallized from methanol, to yield 2-(β-hexamethyleneiminoethyl)-3-amino-4-cyanopyrazole, of the formula

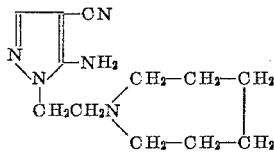

melting at 105–106° C.

A mixture of 116.5 grams of 2-(β-hexamethyleneiminoethyl)-3-amino-4-cyanopyrazole and 80 cc. of concentrated sulfuric acid in 1.75 liters of absolute ethanol is heated in an autoclave for 3 hours at 140° C., then allowed to cool and the residue is mixed with 200 grams of water and 250 grams of sodium bicarbonate and extracted with ether. The ethereal solution is evaporated and yields crude 2-(β-hexamethyleneiminoethyl)-3-amino-4-carbethoxypyrazole of the formula

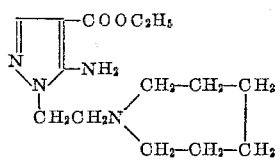

A solution of 16.4 grams of this base in 10 cc. of ethanol is treated with 36.4 cc. of 1.61 N-ethanolic hydrochloric acid. The solution is considerably concentrated and then mixed with diethyl ether, whereupon the hydrochloride melting at 172–174° C. separates out.

A mixture of 67 grams of crude 2-(β-hexamethyleneiminoethyl)-3-amino-4-carbethoxypyrazole and 180 cc. of hydrazine hydrate is heated for 8½ hours at 130° C., then allowed to cool, and the crystals are suctioned off and recrystallized from ethanol, to yield 2-(β-hexamethyleneiminoethyl)-3-aminopyrazole-4-carboxylic acid hydrazide of the formula

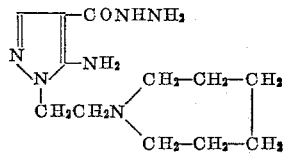

melting at 166–167° C.

When a solution of 35 grams of this base in 250 cc. of ethanol is treated with 82 cc. of 1.61 N-ethanolic hydrochloric acid, the hydrochloride melting at 186–188° C. precipitates.

Example 10

A mixture of 70 grams of 2-(β-chloroethyl)-3-amino-4-cyanopyrazole and 280 cc. of isopropylamine is heated for 1½ hours at 100° C., then evaporated in vacuo and the residue is triturated with water. The resulting insoluble constituent is 2-(β-isopropylaminoethyl)-3-amino-4-cyanopyrazole of the formula

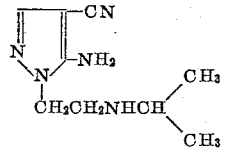

which is treated with 250 cc. of absolute ethanol, freed by filtration from a little insoluble material and the filtrate is treated with ethanolic hydrochloric acid to establish a pH of 4. 2-(β-isopropylaminoethyl)-3-amino-4-cyanopyrazole hydrochloride melting at 275–276° C. crystallizes spontaneously from the solution.

58 grams of crude 2-(β-isopropylaminoethyl)-3-amino-4-cyanopyrazole and 80 cc. of concentrated sulfuric in 1.8 liters of absolute ethanol are heated in an autoclave for 3 hours at 140° C., allowed to cool, evaporated in vacuo, and the residue is treated with 250° cc. of water and 250 grams of sodium bicarbonate and extracted with chloroform. The chloroform solution is evaporated and yields crude 2-(β-isopropylaminoethyl)-3-amino-4-carbethoxypyrazole which is heated with 165 cc. of hydrazine hydrate for 6 hours at 130° C., then allowed to cool, and the crystals are suctioned off and dissolved in ethanol. The solution is adjusted with ethanolic hydrochloric acid to pH=6, and the precipitated crystals are suctioned off and recrystallized twice from ethanol of 95% strength, to yield 2-(β-isopropylaminoethyl)-3-aminopyrazole-4-carboxylic acid hydrazide hydrochloride of the formula

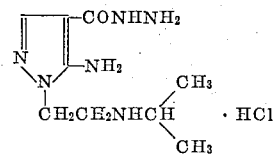

melting at 174–177° C.

Example 11

A mixture of 85 grams of 2-(β-chloroethyl)-3-amino-4-cyanopyrazole and 250 cc. of methylamine is heated for 1½ hours at 100° C. in a closed vessel, then evaporated to dryness, and the residue is heated in an autoclave with 80 cc. of concentrated sulfuric acid and 1.6 liters of absolute ethanol for 3 hours at 140° C., allowed to cool, evaporated in vacuo and the residue is treated with 250 cc. of water and 250 grams of sodium bicarbonate and repeatedly extracted with ether. Evaporation of the ethereal solution yields crude 2-(β-methylaminoethyl)-3-amino-4-carbethoxypyrazole of the formula

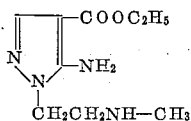

Its hydrochloride melting at 163–166° C. is prepared by dissolving it in ethanol and adding ethanolic hydrochloric acid.

A mixture of 53 grams of the crude 2-(β-methylaminoethyl)-3-amino-4-carbethoxypyrazole prepared as described above and 180 cc. of hydrazine hydrate is heated for 6 hours at 130° C., then allowed to cool, and the precipitated crystals are suctioned off and washed with ethanol, to yield crude 2-(β-methylaminoethyl)-3-aminopyrazole-4-carboxylic acid hydrazide of the formula

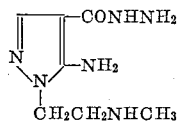

A suspension of 30.8 grams of this hydrazide in 600 cc. of ethanol and 100 cc. of water is treated with 72.3 cc. of 2.15 N-ethanolic hydrochloric acid, then evaporated in vacuo, the residue is triturated with a small amount of ethanol and the crystals are suctioned off, to yield 2 - (β-methylaminoethyl)-3-aminopyrazole-4-carboxylic acid hydrazide hydrochloride melting at 212–215° C.

Example 12

A mixture of 68 grams of 2-(β-chloroethyl)-3-amino-4-cyanopyrazole and 200 cc. of dimethylamine is heated for 1½ hours at 100° C. in a closed vessel, then evaporated in vacuo, the residue is triturated with 2 N-sodium hydroxide solution, and the crystals are suctioned off and washed with water, to yield 2-(β-dimethylaminoethyl)-3-amino-4-cyanopyrazole of the formula

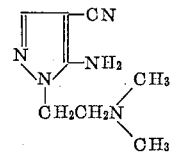

melting at 121–123° C. Recrystallization from ethyl acetate+petroleum ether raises the melting point to 125–126° C.

A mixture of 95 grams of 2-(β-dimethylaminoethyl)-3-amino-4-cyanopyrazole and 80 cc. of concentrated sulfuric acid in 1.6 liters of absolute ethanol is heated in an autoclave for 3 hours at 140° C., allowed to cool, then evaporated in vacuo and the residue is treated with 250 cc. of water and 250 grams of sodium bicarbonate and extracted with ether. Evaporation of the ethereal solution yields crude 2-(β-dimethylaminoethyl)-3-amino-4-carbethoxypyrazole which is mixed with 210 cc. of hydrazine hydrate and heated for 6 hours at 130° C., then allowed to cool, and the crystals are suctioned off and washed with ethanol, dissolved in 2.5 liters of absolute ethanol and the solution is treated with 243 cc. of 0.95 N-ethanolic hydrochloric acid. The solution is concentrated to about 1.5 liters, whereupon 2-(β-dimethylaminoethyl)-3-aminopyrazole-4-carboxylic acid hydrazide hydrochloride of the formula

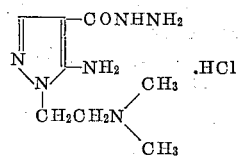

melting at 198–200° C. separates out.

Example 13

A mixture of 85 grams of 2-(β-chloroethyl)-3-amino-4-cyanopyrazole and 330 cc. of n-propylamino is heated for 1½ hours at 100° C. in a closed vessel, then evaporated in vacuo and the residue is triturated with water. The insoluble constituent is crude 2-(β-n-propylaminoethyl)-3-amino-4-cyanopyrazole of the formula

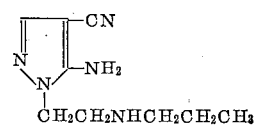

which is boiled in absolute ethanol, freed from a small amount of undissolved material and treated with alcoholic hydrochloric acid to establish a pH of 3.5, whereupon the hydrochloride of 2-(β-n-propylaminoethyl)-3-amino-4-cyanopyrazole melting at 267–268° C. separates out.

A mixture of 73 grams of crude 2-(β-n-propylaminoethyl)-3-amino-4-cyanopyrazole and 60 cc. of concentrated sulfuric acid in 1.35 liters of absolute ethanol is heated in an autoclave for 3 hours at 140° C., then allowed to cool and evaporated in vacuo. The residue is treated with 200 cc. of water and 190 grams of sodium bicarbonate and extracted with chloroform. On evaporation, the chloroform solution yields crude 2-(β-n-propylaminoethyl) - 3 - amino-4-carbethoxypyrazole of the formula

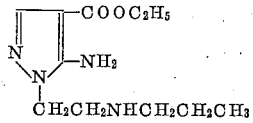

This crude product is dissolved in absolute ethanol, the solution is adjusted to pH 3 with ethanolic hydrochloric acid and evaporated in vacuo. The residue is dissolved in water, a little insoluble material is filtered off and the clear solution is again evaporated. The residue is recrystallized from ethanol+diethyl ether and yields the hydrochloride of 2 - (β-n-propylaminoethyl)-3-amino-4-carbethoxypyrazole melting at 148–151° C.

A mixture of 72 grams of crude 2-(β-n-propylaminoethyl)-3-amino-4-carbethoxypyrazole and 225 cc. of hydrazine hydrate is heated for 6 hours at 130° C., then allowed to cool, and the crystals are suctioned off, treated with ethanol and the layer insoluble in ethanol is separated. The supernatant alcoholic layer is filtered and adjusted to pH 7.5 with ethanolic hydrochloric acid. The solution is slightly concentrated, whereupon 2-(β-n - propylaminoethyl)-3-aminopyrazole-4-carboxylic acid hydrazide hydrochloride of the formula

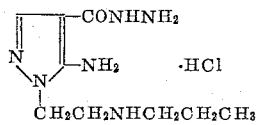

separates out; after having been recrystallized from ethanol it melts at 192–194° C.

*Example 14*

19.9 g. of 2-β-hydroxyethyl-3-amino-4-carbethoxypyrazole and 20 cc. of hydrazine hydrate are heated together for 6 hours in a bath of 120° C. The reaction mass is then evaporated to dryness under reduced pressure, and the residue crystallized from ethyl alcohol. 2-β-hydroxyethyl-3-amino-pyrazole-4-carboxylic acid hydrazide of the formula

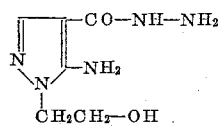

is thus obtained in the form of colorless crystals of melting point 236–237° C.

*Example 15*

98.5 g. of 2 - isopropyl-3-amino-4-carbethoxy-pyrazole are refluxed for 3 hours with 1.25 liters of 2 N-sodium hydroxide solution. After cooling, the reaction solution is rendered acid to Congo red with 5 N-hydrochloric acid, whereupon the 2-isopropyl-3-amino-pyrazole-carboxylic acid of the formula

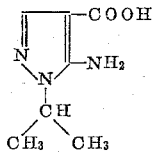

of melting point 152–154° C. separates.

245 g. of the above acid are heated in 800 ml. of acetic anhydride for 2 hours in an oil bath heated at 100–110° C. The batch is then evaporated to dryness under reduced pressure. The residue is suspended hot in 800 ml. of isopropyl ether. After cooling, the crystals are filtered off with suction. There is obtained in this manner 1 - isopropyl-4-oxo-6-methyl-pyrazolo[3,4-d]oxazine of melting point 109–111° C.

The 2 - isopropyl-3-acetylamino-4-pyrazole-carboxylic acid-(5'-nitro-furfurylidene)-methyl hydrazide may also be prepared by reacting 5-nitrofufural with 2-isopropyl-3 - acetylamino-4-pyrazole-carboxylic acid methylhydrazide.

What is claimed is:
1. A member selected from the group consisting of a compound of the formula

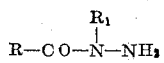

in which R is a 5-R'-3-R''-pyrazolyl-(4) radical substituted at one of the pyrazole ring nitrogen atoms by the radical R''', R' being a member selected from the group consisting of hydrogen and lower alkyl, R'' being a member selected from the group consisting of amino, lower alkanoylamino, benzoylamino and hydroxy and R''' being a member selected from the group consisting of branched-chain lower alkyl, hydroxy-lower alkyl, amino-lower alkyl, mono lower alkyl-amino-lower alkyl, di-lower alkylamino - lower alkyl, monocycloalkylamino-lower alkyl, N-lower alkyl-N-lower cycloalkyl-amino-lower alkyl, pyrrolidino-lower alkyl, piperidino-lower alkyl, piperazino-lower alkyl, morpholino-lower alkyl, N'-lower alkyl-piperazino-lower alkyl and N'-hydroxy-lower alkyl-piperazino-lower alkyl, and $R_1$ stands for a member selected from the group consisting of hydrogen and lower alkyl, and their acid addition salts.

2. A member selected from the group consisting of a compound of the formula

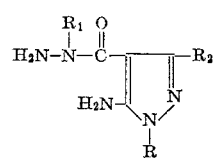

in which $R_1$ and $R_2$ each stands for a member selected from the group consisting of hydrogen and lower alkyl and R for a member selected from the group consisting of di-lower alkylamino-lower alkyl, pyrrolidino-lower alkyl, piperidino-lower alkyl and morpholino-lower alkyl, and their acid addition salts.

3. A member selected from the group consisting of 2-isopropyl-3-amino-pyrazole-4-carboxylic acid hydrazide and its salts.

4. A member selected from the group consisting of 1-isopropyl-3-amino-pyrazole-4-carboxylic acid hydrazide and its salts.

5. A member selected from the group consisting of 2-(β - dimethylamino-ethyl)-3-amino-pyrazole-4-carboxylic acid hydrazide and its salts.

6. A member selected from the group consisting of 2 - (β-hydroxy-ethyl)-3-amino-pyrazole-4-carboxylic acid hydrazide and its salts.

7. A member selected from the group consisting of 2-(β-ethylamino-ethyl)-3-amino-pyrazole-4-carboxylic acid hydrazide,
2-(β-piperidino-ethyl)-3-amino-pyrazole-4-carboxylic acid hydrazide,
2-(β-morpholino-ethyl)-3-amino-pyrazole-4-carboxylic acid hydrazide,
2-(β-diethylamino-ethyl)-3-hydroxy-pyrazole-4-carboxylic acid hydrazide,
2-(β-hexamethyleneimino-ethyl)-3-amino-pyrazole-4-carboxylic acid hydrazide,
2-(β-isopropylamino-ethyl)-3-amino-pyrazole-4-carboxylic acid hydrazide,
2-(β-methylamino-ethyl)-3-amino-pyrazole-4-carboxylic acid hydrazide,
and 2-(β-n-propylamino-ethyl)-3-amino-pyrazole-4-carboxylic acid hydrazide, and their acid addition salts.

8. A member selected from the group consisting of 2 - (β-diethylamino-ethyl)-3-amino-pyrazole-4-carboxylic acid hydrazide and its acid addition salts.

References Cited by the Examiner

Takamizawa et al.: "Chemical Abstracts," vol. 54, page 16, 467c (1960).

ALEX MAZEL, *Primary Examiner.*

JOSE TOVAR, *Assistant Examiner.*

UNITED STATES PATENT OFFICE
CERTIFICATE OF CORRECTION

Patent No. 3,304,303            February 14, 1967

Paul Schmidt et al.

It is hereby certified that error appears in the above numbered patent requiring correction and that the said Letters Patent should read as corrected below.

Column 12, line 44, for "hydrazine" read -- hydrazide --.

Signed and sealed this 28th day of November 1967.

(SEAL)
Attest:

Edward M. Fletcher, Jr.            EDWARD J. BRENNER
Attesting Officer            Commissioner of Patents